(12) United States Patent
Funakoshi

(10) Patent No.: US 6,594,225 B1
(45) Date of Patent: Jul. 15, 2003

(54) DISK ROTATION MONITORING MECHANISM WITH PARALLEL SENSOR UNIT

(75) Inventor: Hideaki Funakoshi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 09/516,460

(22) Filed: Mar. 1, 2000

(51) Int. Cl.⁷ .............................. G11B 5/82; G11B 19/06
(52) U.S. Cl. ...................................... 369/290; 365/53.3
(58) Field of Search ...................... 360/73.03; 365/53.1, 365/53.11, 53.3; 250/231.13; 369/289, 290

(56) References Cited

U.S. PATENT DOCUMENTS

| | | | | |
|---|---|---|---|---|
| 4,654,725 A | * | 3/1987 | Wakaizumi | ............ 360/97 |
| 4,819,051 A | * | 4/1989 | Jacobson | ........ 250/231.13 X |
| 5,006,703 A | * | 4/1991 | Shikunami et al. | ..... 250/213.13 |
| 5,026,985 A | * | 6/1991 | Ishizuka et al. | ........ 250/231.16 |
| 5,051,579 A | * | 9/1991 | Tsukiji et al. | ........... 250/231.16 |
| 5,576,830 A | * | 11/1996 | O'Brien et al. | ..... 250/213.13 X |
| 5,631,884 A | * | 5/1997 | Chun | ......................... 369/75.2 |
| 5,773,820 A | * | 6/1998 | Osajda et al. | ....... 250/231.13 X |
| 5,883,384 A | * | 3/1999 | Kato et al. | ............. 250/231.13 |

\* cited by examiner

*Primary Examiner*—Aristotelis M. Psitos
(74) *Attorney, Agent, or Firm*—Morgan, Lewis & Bockius LLP

(57) ABSTRACT

An information recording disk is disposed on a turntable. A damper fasten the information recording disk onto the turntable and coaxially rotated together with the turntable. A sensor unit includes a photo emitter and a photo detector opposed to each other such that respective optical axes are aligned on a straight line. An interception member is formed with the damper and periodically intercepts light emitted from the photo emitter so that the sensor unit detects the damper rotates together with the information recording disk.

5 Claims, 3 Drawing Sheets

DISK ROTATION MONITORING MECHANISM WITH PARALLEL SENSOR UNIT

BACKGROUND OF THE INVENTION

The present invention relates to an information recording/reproduction apparatus, such as a DVD, CD-ROM, CD, CD-R, or LD apparatus, which has a mechanism which tightly fastens the disc between a turntable and a clamper when an information recording disc, such as DVD, CD-ROM, CD, CD-R or LD, is rotated, and a rotation monitoring mechanism for the information recording disk assembled into the information recording/reproduction apparatus.

The DVD apparatus, for example, has been provided with a rotation monitoring mechanism for monitoring a rotation state of a DVD as an information recording disc.

A main role of the rotation monitoring mechanism is to generate a signal which is utilized for checking as to if the DVD has reliably been stopped in rotation after a STOP/EJECT button is pushed with intention of taking the DVD out of the apparatus.

Another role of the rotation monitoring mechanism is to generate a signal which is utilized for checking as to if the rotational speed of the DVD, for example, is abnormally high.

Yet another role of the rotation monitoring mechanism is to generate a signal utilized for the rotation servo system.

FIG. 2 shows a first related rotation monitoring mechanism designed for performing those roles, which indirectly detects a rotation state of a disc (DVD) 990 by detecting a rotation state of a turntable 910 for supporting and rotating the disc 990. The related rotation monitoring mechanism includes the turntable 910, a magnetic sensor 940 mounted on a small board 930, which is located in a small gap between the turntable and the upper face of a DC motor 920 for driving the turntable 910, and magnets (not shown) which are circularly buried in the lower face of the turntable 910 at a predetermined pitch so as to pass through right above the magnetic sensor 940 when the turntable 910 is rotated.

In FIG. 2, reference numeral 970 is a damper of which the cross section is shaped like H laid laterally. The disc 990 is tightly fastened between the damper 970 and the turntable 910. Usually, the front loading type DVD apparatus includes such damper 970.

A recess 972 into which a top portion of protrusion 910a formed on the central portion of the turntable 910 is to be inserted is formed in the lower side of the camper 970. Usually, a magnet 971 (or any other metal plate, e.g., an iron plate, magnetically attracted) is buried in the bottom of the recess 972. An iron plate 910a1 (or magnet) is attached to the top face of a protrusion 910a of the turntable 910. The magnet 971 and the iron plate 910a1 bring the camper 970 into press-contact with the turntable 910 magnetically (or by the utilization of a magnetic attraction force) in order to firmly hold the disc 990 being fastened between the damper 970 and the turntable 910.

Reference numeral 980 designates a chucking plate for rotatably holding the damper 970. A main board, not shown, (usually provided separately from the small board 930) of the DVD apparatus is provided under the DC motor 920.

The user sets a disc 990 on a tray (not shown) of the front loading mechanism of the DVD apparatus. Then, the container with the disc located thereon transports the disc 990 to a predetermined position in the innermost part of the apparatus. Thereafter, the DC motor 920, the turntable 910, and the board 930, which have been at locations not in contact with the tray in the lower part of the apparatus, are lifted by a lifting mechanism through an opening formed in the tray up to a predetermined position such that a supporting face of the turntable 910 for the disc 990 is situated above the tray.

At this predetermined position, the turntable 910 supports the disc 990 instead of the tray. The bottom face of the damper 970 is pressed against the top face of the central part of the disc 990. That is, the disc 990 is tightly fastened between the turntable 910 and the damper 970.

Namely, the magnetic sensor 940 in the first related rotation monitoring mechanism detects a rotation state of the turntable 910 in the form of variation of a magnetic field developed from the magnet of the rotation monitoring mechanism, which is provided in the bottom face of the turntable 910.

In the first related rotation monitoring mechanism thus constructed, where a length of a rotary shaft 921 of the DC motor 920 is long, the motor rotation is unsteady. To avoid this, the length of the rotary shaft is selected to usually be short, about 5 mm. It is necessary that the diameter of the turntable 910 is selected so that it does not cover an information recording area of the disk 990. Further, the DC motor 920 is required to generate a torque large enough to turn the disc 990. Accordingly, the diameter of the DC motor 920 is selected to be substantially equal to that of the turntable 910. For this reason, the magnetic sensor 940 mounted on the small board 930 is located in a small gap of about 5 mm wide between the turntable 910 and the upper face of the DC motor 920 for driving the turntable 910, in order to detect a variation of a magnetic field developed from the magnet provided on the bottom face of the turntable 910. This necessitates the use of an expensive Hall element for the rotation detector that may be mounted on the small board 930 (viz., the magnetic sensor 940 consists of a Hall element.).

Thus, the rotation monitoring mechanism rejects the use of a relatively inexpensive photo sensor, but requires the use of an expensive Hall element (in some cases, additional circuits, for example, an amplifier for amplifying a weak signal output from the Hall element). Further, the small board 930 on which the Hall element is mounted is separated from the main board since a positional limitation is present for the sensor mounting and it must be designed to be movable. This fact presents a hindrance to the effort of reducing the cost to manufacture.

A second related rotation monitoring mechanism is disclosed in Japanese Patent Publication No. 7-56726A. In the mechanism, a synchronizing mark is attached to the disc in advance. It is used for detecting a rotation state of the disc per se. In the rotation monitoring mechanism, a photo sensor for detecting the synchronizing mark is provided at a position under the disc, outside the DC motor for driving the disc, and relatively close to a position where the synchronizing mark passes through.

The second related rotation monitoring mechanism allows the use of a relatively inexpensive photo sensor, but it is disadvantageous in that the synchronizing mark is indispensably attached to the disc. This leads to increase of manufacturing cost. Further, the rotation monitoring mechanism is incapable of monitoring a disc not having the synchronizing mark. Further, the board on which the photo sensor is mounted is required in addition to the main board since a positional limitation is present for the sensor mounting. This fact presents a hindrance in realizing cost reduction.

A third related rotation monitoring mechanism shown in FIGS. 3 and 4 is disclosed in Japanese Utility Model No. 3060766. In the figure, members similar to the first related art are designated by the same reference numerals used for explaining the first related art, and detailed explanation is omitted.

In the mechanism, windows 1173A and shield portions 1173B are alternately and circularly formed on a damper 1170 at a predetermined pitch as a detected member 1173. A photo emitter 1140A and a photo detector 1140B are respectively fitted into a holder 1140C to constitute a-sensor unit 1140. A reflector 1180 is arranged at an intersection of optical axes of the photo emitter 1140A and the photo detector 1140B so that light emitted from the photo emitter 1140A and passed through one of the windows 1173A is reflected to be detected by the photo detector 1140B. A shield wall 1140C1 is provided between the photo emitter 1140A and the photo detector 1140B to prevent erroneous detection.

When the camper is rotated together with the turntable 910, the windows 1173A and the shield portions 1173B are alternately pass through a space between the photo emitter 140A and the photo detector 140B, whereby light transmission/interception is detected.

The third related rotation monitoring mechanism detects a rotation state of the information recording disc with the aid of the clamper. Therefore, there is no need of using a synchronizing mark attached in advance to the information recording disc. Accordingly, the rotation monitoring mechanism is capable of monitoring a rotation state of any type of the information recording disc.

However, due to the necessity of providing the reflector 1180 and the shield wall 1140C1, the structure of mechanism becomes complicated and large space for the sensor unit 1140 is required. Thereby the manufacturing cost reduction cannot be attained.

Further, according to the configuration, the optical length between the photo emitter 1140A and the photo detector 1140B becomes long. Thereby the possibility of erroneous detection rises.

Still further, when the damper 1170 is rotated eccentrically due to unsteady rotation of the turntable 910 or the like, the windows are horizontally deviated from the predetermined position and thereby the light interception/transmission may be erroneously detected.

SUMMARY OF THE INVENTION

Accordingly, an object of the present invention is to provide a rotation monitoring mechanism and an information recording/reproduction apparatus, which are capable of accurate monitoring a rotation of a disc irrespective of a type of the disc, and capable of reducing the manufacturing cost.

In order to achieve the above object, according to the present invention, there is provided a mechanism for monitoring rotation of an information recording disk, comprising:
 a turntable on which the information recording disk is disposed;
 a damper coaxially rotated with the turntable while fastening the information recording disk onto the turntable;
 a sensor unit including a photo emitter and a photo detector opposed to each other such that respective optical axes are aligned on the straight line; and
 an interception member formed with the damper for periodically intercepting light emitted from the photo emitter so that the sensor unit detects the damper rotates together with the information recording disk.

Preferably, the interception member includes a plurality of shield plates for intercepting the light emitted from the photo emitter, which are circularly arranged on the camper at a predetermined pitch such that the center of the circular arrangement is coincident with the rotation center of the clamper. Here, the respective shield plates extend in a direction perpendicular to a rotation plane of the clamper.

Preferably, the interception member includes:
 a transparent cylindrical member formed on the damper so as to extend in a direction perpendicular to a rotation plane of the damper such that the central axis thereof is coincident with the rotation center of the clamper; and
 a plurality of shield patterns for intercepting the light emitted from the photo emitter, which are arranged on the outer circumferencial wall of the cylindrical member at a predetermined pitch.

Preferably, the interception member includes a cylindrical member formed on the damper so as to extend in a direction perpendicular to a rotation plane of the damper such that the central axis thereof is coincident with the rotation center of the clamper. Here, the circumferencial wall of the cylindrical member includes first portions made of a light-transparent material and second portions made of a light-opaque material which are arranged alternately at a predetermined pitch.

The interception member periodically crosses the optical path between the photo emitter and the photo detector, whereby light transmission/interception is detected without providing a reflector and a shield wall between the photo emitter and the photo detector as in the third related mechanism.

Therefore, the overall structure of the mechanism becomes simple and a large space for the sensor unit is not required. Accordingly, the manufacturing cost can be remarkably reduced.

Furthermore, since the optical length between the photo emitter and the photo detector can be shorten and simplified, the erroneous detection of the light transmission/interception can be remarkably reduced.

Still further, even if the clamper is eccentrically rotated due to unstable rotation of the turntable or the like, since the deviated direction of the detected member is in parallel with the optical path of the light emitted from the photo emitter, the influence of the eccentric rotation leading the erroneous detection of the light transmission/interception can be remarkably reduced.

It is noted that the photo emitter and the photo detector of the sensor unit are extremely low in cost. This leads to reduction of the cost to manufacture the rotation monitoring mechanism. In addition, according to the above configuration, an S/N ratio of the sensor unit may be increased. Therefore, if the output power of the photo emitter somewhat reduces by its aging, no problem arises in the sensor unit. The lifetime of the rotation monitoring mechanism is elongated.

Preferably, the sensor unit is mounted on a circuit board commonly used for the turntable and the clamper.

Therefore, there is no need of using a dedicated board having the sensor unit provided thereon. As a result, cost reduction of the rotation monitoring mechanism of the present invention is realized.

According to the present invention, there is also provided a mechanism for monitoring rotation of an information recording disk, comprising:

a turntable on which the information recording disk is disposed;

a damper coaxially rotated with the turntable while fastening the information recording disk onto the turntable;

first reflection members having a first reflectivity and second reflection members having a second reflectivity different from the first reflectivity, which are circularly and alternately arranged on the damper at a predetermined pitch; and a reflection-type sensor unit for detecting reflectivity of emitted light therefrom which is varied by the first and the second reflection members to detect that the damper rotates together with the information recording disk.

Preferably, the sensor unit is mounted on a circuit board commonly used for the turntable and the clamper.

According to the present invention, there is provided an information recording/reproduction apparatus for an information recording disk, comprising the rotation monitoring mechanism as described above.

Also according to the above configuration, the cost reduction can be realized.

DETAILED DESCRIPTION OF THE PREFERRED EMBODIMENTS

The preferred embodiments of the present invention will be described below in detail with reference to the accompanying drawings.

Figure 1A:
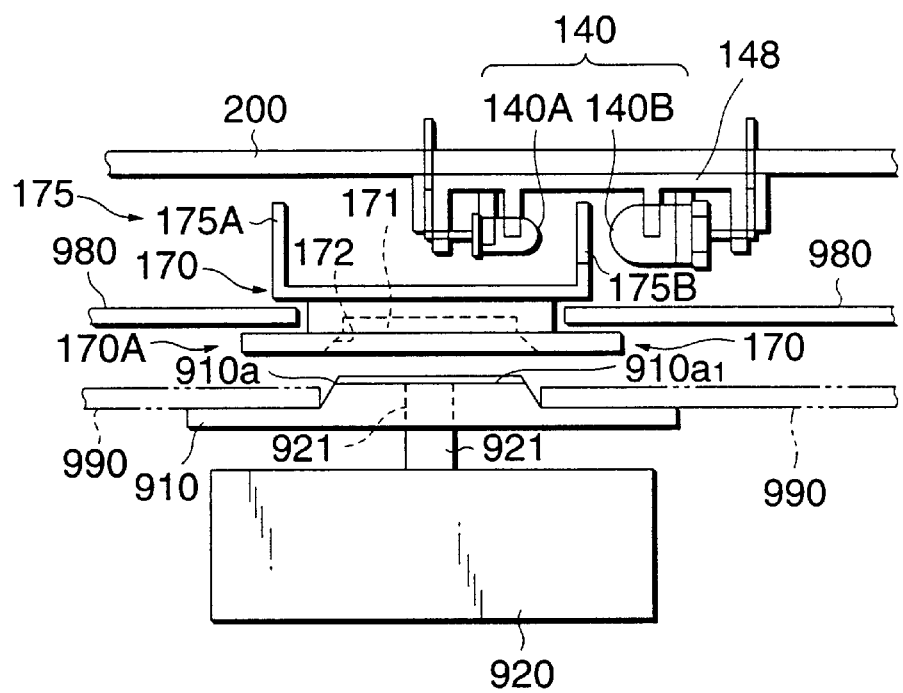
FIG. 1A is a sectional side view showing a rotation monitoring mechanism and a peripheral part thereof in an information recording/reproduction apparatus according to one embodiment of the present invention.
Figure 1B:
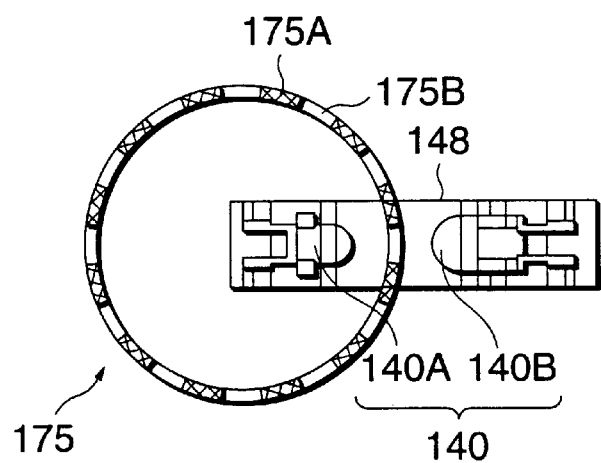
FIG. 1B is a top view showing the rotation monitoring mechanism shown in FIG. 1A.
Figure 2:
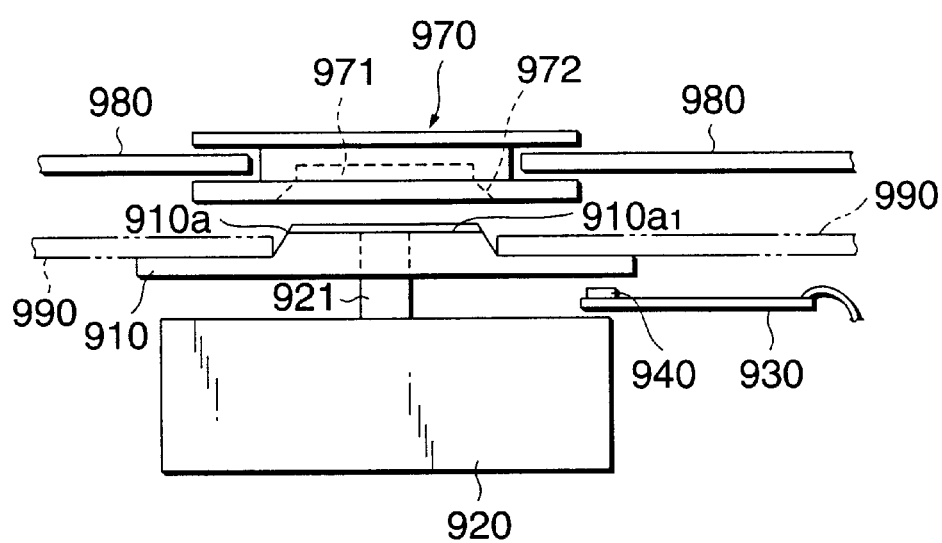
FIG. 2 is a sectional side view showing a first related rotation monitoring mechanism and a peripheral part thereof in an information recording/reproduction apparatus.
Figure 3A:
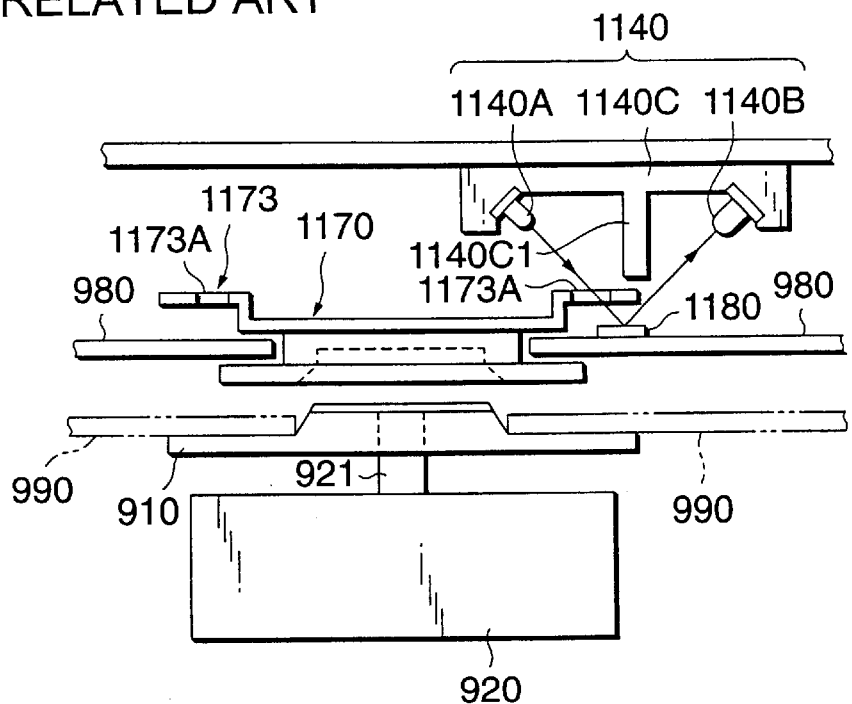
FIG. 3A is a sectional side view showing a third related rotation monitoring mechanism and a peripheral part thereof in an information recording/reproduction apparatus.
Figure 3B:
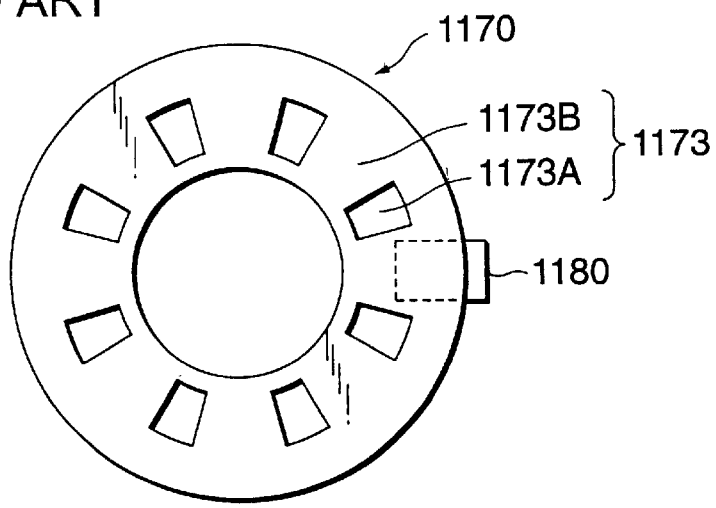
FIG. 3B is a top view showing the rotation monitoring mechanism shown in FIG. 3A.

FIG. 1A is a sectional side view showing a rotation monitoring mechanism and a peripheral part thereof in an information recording/reproduction apparatus according to one embodiment of the present invention. FIG. 1B is a top view showing the rotation monitoring mechanism shown in FIG. 1A.

In the figure, members similar to the first related art are designated by the same reference numerals used for explaining the first related art.

The rotation monitoring mechanism is assembled into a front loading DVD apparatus (information recording/reproduction apparatus) having a mechanism for clamping a disc (DVD) 990 as an information recording disc in a state that the information recording disc is fastened between a turntable 910 and a damper 170, when the information recording disc is rotated.

The DVD apparatus is shaped like a box. Operations buttons (not shown), such as a PLAY button, a STOP button, and an EJECT button, are provided on the front panel of the DVD apparatus. A tray of a front loading mechanism (not shown) is provided on the front side of the DVD apparatus slidably back and forth. The tray has an opening formed in the central portion thereof. Under the opening of the tray when it is loaded into the DVD apparatus, the following components and mechanism are located: a two-step disc-like turntable 910 the central portion of which a circular protrusion 910a is formed; a DC motor 920 for driving the turntable 910 disposed below the turntable; a lifting mechanism (not shown) for vertically moving the turntable and the motor; and an optical pick-up mechanism (not shown). The structure thus far described is the same as the well-known DVD apparatus.

An iron plate 910a1 is attached to the top face of the protrusion 910a of the turntable 910.

The clamper 170 and a strip-like chucking plate 980 for rotatably holding the damper 170 are provided above the turntable 910. A main board 200 of the DVD apparatus is disposed above the damper 170 and the chucking plate 980. Circuits (not shown) of a control unit for controlling and driving the overall DVD apparatus, and a sensor unit 140 to be described later are mounted on the main board 200.

The main board 200 and the chucking plate 980 are fastened to a chassis (not shown) of the DVD apparatus.

The rotation monitoring mechanism is formed with the sensor unit 140 soldered to the lower face of the main board 200, which is located above the clamper 170, and a detected member 175, which is provided on the damper 170 in opposition to the sensor unit 140.

The sensor unit 140 is of the called transmission type, and formed of a combination of a photo emitter 140A and a photo detector 140B. The photo emitter 140A is an infrared LED, for example, and the photo detector 140B is a photo transistor, for example.

The sensor unit 140 is soldered to the main board 200. The optical axes and leads of the photo emitter 140A and the photo detector 140B are aligned in the same direction before those are molded. The leads of the photo emitter 140A and the photo detector 140B are bent shaped like L in order to arrange those elements to be in opposition to each other through the detected structure 175 in between. The photo emitter 140A and the photo detector 140B are respectively fitted into a holder 148 so as to be opposed with each other and such that the optical axes thereof are aligned with each other. The photo emitter 140A and the photo detector 140B, in such a state, are soldered to the main board 200 together with the holder 148.

The detected member 175, which is provided in the damper 170, is extended upwardly of the related damper 970. The detected member 175 lies on a prolongation of the optical axis of the combination of the photo emitter 140A and the photo detector 140B.

The detected member 175 is provided as a plurality of interceptors 175A formed as rectangular plates transmitters 175B formed as notched portions which are arranged alternately at fixed pitches.

The interceptors 175A and the transmitters 175B alternately pass through a space between the photo emitter 140A and the photo detector 140B, whereby light transmission/interception is detected without providing a reflector and a shield wall between the photo emitter 140A and the photo detector 140B as in the third related mechanism.

Therefore, the overall structure of the mechanism becomes simple and a large space for the sensor unit 140 is not required. Accordingly, the manufacturing cost can be remarkably reduced.

Furthermore, since the optical length between the photo emitter 140A and the photo detector 140B can be shorten and simplified, the erroneous detection of the light transmission/interception can be remarkably reduced.

Still further, even if the damper 170 is eccentrically rotated due to unstable rotation of the turntable 910 or the like, since the deviated direction of the detected member is in parallel with the optical path of the light emitted from the photo emitter 140A, the influence of the eccentric rotation leading the erroneous detection of the light transmission/interception can be remarkably reduced.

The damper 170 the cross section of which is shaped like H laid laterally. The damper 170 is formed with a lower portion 170A and the detected member 175 standing erect on the peripheral edge of the upper face of the lower portion 170A.

The lower portion 170A of the damper 170 presses down the upper side of the central portion of the disc 990 disposed on the turntable 910.

A recess 172 into which a protrusion 910a of the turntable 910 is to be inserted is formed in the bottom face of the lower portion 170A. Usually, a magnet 171 is buried in the bottom of the recess 172. The magnet 171 and the iron plate 910a1 of the turntable 910 bring the damper 170 into press-contact with the turntable 910 magnetically (or by the utilization-of a magnetic attraction force) in order to firmly hold the disc 990 being fastened between the damper 170 and the turntable 910.

In the thus constructed DVD apparatus, the rotation monitoring mechanism operates in the following ways.

The main role of the rotation monitoring mechanism is to generate a signal to check as to if the disc 990 has reliably been stopped, a signal to check as to if the rotational speed of the disc 990 is abnormally high, and a signal to be used for the rotation servo system, after the user pushes a STOP/EJECT button to take the disc 990 out of the DVD apparatus.

Upon depression of the EJECT button by the user, the tray of the front loading mechanism is ejected out to the front side of the DVD apparatus. Then, the user sets a disc 990 on the tray. He pushes the EJECT button again. Then, the container with the disc located thereon is returned to its original position within the DVD apparatus. Thus, the tray of the front loading mechanism transports the disc 990 to a predetermined position in the innermost part of the apparatus. Thereafter, the DC motor 920 and the turntable 910, which have been at locations not in contact with the tray in the lower part of the apparatus, are lifted by a lifting mechanism through an opening formed in the tray up to a predetermined position such .that a supporting face of the turntable 910 for the disc 990 is situated above the tray.

At this predetermined position, the turntable 910 supports the disc 990. Further, the upper side of the protrusion 910a of the turntable 910 is fitted into the recess 172 of the lower side of the camper 170, and the lower face of the magnet 171 of the damper 170 is in contact with the upper face of the protrusion 910a of the turntable 910 or just short of coming in contact with the latter. The iron plate 910a1 is attached to the upper face of the protrusion 910a of the turntable 910. Therefore, the iron plate 910a1 is in a pressing contact with the magnet 171 by a magnetic (attraction) force. Accordingly, the disc 990 is tightly fastened between the turntable 910 and the damper 170.

When the PLAY button (not shown) is pushed by the user, the DC motor 920 starts its a predetermined rotation, and the sensor unit 140 also starts to operate. At the start of the rotation, the damper 170 somewhat slips on the upper surface of the disc 990. Accordingly, for an initial minute time period, the number of revolutions of the disc 990 is slightly different from that of the damper 170, but the former will be equal to the latter immediately thereafter.

Accordingly, the number of revolutions represented by a signal output from the sensor unit 140 is slightly different from the number of revolutions of the disc 990 for the initial minute time period. This difference is extremely small. Therefore, if the control unit uses the output signal as intact for the servo control, no problem arises.

Further, for the initial minute time period, there is no possibility that the rotational speed of the disc 990 is abnormally high. This fact allows the control unit to utilize the output signal of the sensor unit 140 for detecting an abnormally high speed of the disc.

It is allowed that the control unit does not utilize the output signal only for the initial minute time period.

Then, the user pushes the STOP button, and in response to this, the control unit feeds a reverse current to the DC motor 920 to abruptly stop the rotation of the DC motor 920. For a minute time period after the STOP button is pushed, the damper 170 somewhat slips on the upper surface of the disc 990, and then the number of revolutions of the damper 170 will be equal to that of the disc 990, and reduces its speed to stop. Thus, for the minute time period, the number of revolutions represented by the output signal of the sensor unit 140 becomes somewhat larger than an actual number of revolutions of the disc 990.

In this case, the number-of-revolution difference is minute in magnitude, and the number of revolutions of the sensor unit will never exceed that just before the STOP button is pushed. Therefore, if the control unit uses the output signal as intact for the servo control, no problem arises.

Further, for the minute time period, there is no possibility that the rotational speed of the disc 990 is abnormally high. This fact allows the control unit to utilize the output signal of the sensor unit 140 for detecting an abnormally high speed of the disc.

It is allowed that the control unit does not utilize the output signal only for the minute time period.

When the EJECT button is pushed after judgement is made that the output signal of the sensor unit 140 represents zero in the number of revolutions, the control unit executes the ejection operation. Specifically, the control unit directs the lifting mechanism to lift down the turntable 910 and the DC motor 920, and ejects the tray of the front loading mechanism to the front side of the DVD apparatus.

When the EJECT button is pushed before judgement is made that the output signal of the sensor unit 140 represents zero in the number of revolutions, the control unit does not executes the ejection operation till it judges that the output signal of the sensor unit 140 represents zero in the number of revolutions, but effected immediately after the control unit judges that the output signal of the sensor unit 140 represents zero in the number of revolutions.

When the control unit detects an abnormally high rotational speed by the utilization of the signal output from the sensor unit 140, the power supply is reset.

In the rotation monitoring mechanism of the embodiment, the combination of the photo emitter 140A and the photo detector 140B may be replaced with a combination of an infrared LED and a photo transistor in which the optical axis is perpendicular to the leads. In this case, such a holder as the holder 148 may be omitted.

In the rotation monitoring mechanism of the embodiment, the transmitters 175B may be not the notched portions. For example, the detected member 175 may be provided as a transparent wall formed on the entire peripheral edge of the upper face of the damper 170. Instead of changing the height of the transparent wall, the interceptors 175A and the transmitters 175B may be provided by adhering a seal having a stripe pattern. Alternatively, the interceptors 175A and the transmitters 175B may be provided by forming the transparent wall made of a photo transparent material and an anti photo transparent material which are alternately arranged.

In the rotation monitoring mechanism of the embodiment, the sensor unit 140 may be a reflection type sensor. In this case, pattern in which portions having different reflectivity are alternately arranged is circularly printed on the top face of the camper in order to constitute the detected member. Alternatively, seals having different reflectivity may be circularly adhered to the top face of the clamper. Still alternatively, recesses may be circularly formed on the top face of the damper at a predetermined pitch such that portions having different reflectivity are arranged alternately.

In the rotation monitoring mechanism of the embodiment, the sensor unit 140 may be a magnetic sensor, e.g., a Hall element. In this case, it is preferable that magnetic members are circularly arranged at a predetermined pitch.

While the detected member is provided on the top face of the damper in the embodiments described so far, it may be provided on the side portion thereof, for example. In this case, the sensor unit is preferably opposed to the detected member.

In the rotation monitoring mechanism of the embodiment, although the magnet is buried in the clamper, and the iron plate (if required, any other metal plate other than the iron plate if it magnetically attracted) is attached to the top face of the upper portion of the turntable, magnet may be attached to also the turntable. Alternatively, such a metal plate as to be magnetically attracted, e.g., an iron plate, is buried in the clamper, and a magnet is attached to the upper portion of the turntable.

In the embodiment, the rotation monitoring mechanism is assembled into the DVD apparatus of the type in which the disc 990 is horizontally loaded. It is evident that the rotation monitoring mechanism may be assembled into the DVD apparatus of the type in which disc is loaded vertically, not horizontally. Further, the rotation monitoring mechanism may be assembled into a DVD apparatus which corresponds to the above-mentioned DVD apparatus in which the illustrated structure is vertically inverted.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A mechanism for monitoring rotation of an information disk, comprising:
    a turntable having a surface on which the information recording disk is disposed;
    a damper coaxially rotated with the turntable while fastening the information recording disk onto the turntable;
    a sensor unit including a photo emitter and a photo detector opposed to each other such that respective optical axes are aligned on a straight line and disposed substantially parallel to the turntable surface; and
    an interception member formed with the clamper for periodically intercepting the light emitted from the photo emitter so that the sensor unit detects the light emitted from the photo emitter, wherein the clamper rotates together with the information recording disk, wherein the photo emitter is disposed at an inner circumferential side of the damper relative to the interception member, and the photo detector is disposed at an outer circumferential side of the damper relative to the interception member.

2. The rotation monitoring mechanism as set forth in claim 1, wherein the interception member includes a plurality of shield plates for intercepting the light emitted from the photo emitter, which are circularly arranged on the damper at a predetermined pitch such that the center of the circular arrangement is coincident with the rotation center of the clamper; and
    wherein the respective shield plates extend in a direction perpendicular to a rotation plane of the clamper.

3. The rotation monitoring mechanism as set forth in claim 1, wherein the interception member includes:
    a transparent cylindrical member formed on the damper so as to extend in a direction perpendicular to a rotation plane of the damper such that the central axis thereof is coincident with the rotation center of the clamper; and
    a plurality of shield patterns for intercepting the light emitted from the photo emitter, which are arranged on the outer circumferencial wall of the cylindrical member at a predetermined pitch.

4. The rotation monitoring mechanism as set forth in claim 1, wherein the interception member includes a cylindrical member formed on the damper so as to extend in a direction perpendicular to a rotation plane of the damper such that the central axis thereof is coincident with the rotation center of the clamper; and
    wherein the circumferencial wall of the cylindrical member includes first portions made of a light-transparent material and second portions made of a light-opaque material which are arranged alternately at a predetermined pitch.

5. The rotation monitoring mechanism as set forth in claim 1, wherein the sensor unit is mounted on a circuit board commonly used for the turntable and the clamper.

* * * * *